(12) United States Patent
Yamazaki (10) Patent No.: US 12,151,542 B2
(45) Date of Patent: Nov. 26, 2024

(54) VEHICLE SUN VISOR

(71) Applicant: KYOWA SANGYO CO., LTD., Toyota (JP)

(72) Inventor: Kosuke Yamazaki, Okazaki (JP)

(73) Assignee: KYOWA SANGYO CO., LTD., Toyota (JP)

( * ) Notice: Subject to any disclaimer, the term of this patent is extended or adjusted under 35 U.S.C. 154(b) by 284 days.

(21) Appl. No.: 17/639,430

(22) PCT Filed: Aug. 25, 2020

(86) PCT No.: PCT/JP2020/032024
§ 371 (c)(1),
(2) Date: Mar. 1, 2022

(87) PCT Pub. No.: WO2021/044906
PCT Pub. Date: Mar. 11, 2021

(65) Prior Publication Data
US 2022/0289003 A1    Sep. 15, 2022

(30) Foreign Application Priority Data

Sep. 6, 2019 (JP) .................................. 2019-163045

(51) Int. Cl.
*B60J 3/02* (2006.01)
(52) U.S. Cl.
CPC ............. *B60J 3/0239* (2013.01); *B60J 3/023* (2013.01); *B60J 3/0282* (2013.01)
(58) Field of Classification Search
CPC ........ B60J 3/023; B60J 3/0239; B60J 3/0282; B60J 3/0265; B60J 3/0234

(Continued)

(56) References Cited

U.S. PATENT DOCUMENTS

| 4,925,233 A | * | 5/1990 | Clark | ..................... B60J 3/0239 |
| | | | | 296/97.11 |
| 5,161,850 A | * | 11/1992 | Redder | .................. B60J 3/0234 |
| | | | | 296/97.11 |

(Continued)

FOREIGN PATENT DOCUMENTS

| JP | 2010-023545 A | 2/2010 |
| JP | 2010-173385 A | 8/2010 |

(Continued)

OTHER PUBLICATIONS

Oct. 13, 2020 Search Report issued in International Patent Application No. PCT/JP2020/032024.

(Continued)

*Primary Examiner* — Amy R Weisberg
*Assistant Examiner* — Veronica M Shull
(74) *Attorney, Agent, or Firm* — Oliff PLC (57) ABSTRACT

A vehicle sun visor includes a visor body including a first component member and a second component member that are stacked in a thickness direction, and a support shaft. In the visor body, a case that supports the support shaft such that the support shaft is turnable and that is slidably fitted to the visor body is provided. The case is provided with a clip that urges the visor body toward a storage position by urging the support shaft. A guide rail that prevents the case from falling in the thickness direction with respect to the first component member is provided. The guide rail is formed integrally with the first component member to support the case such that the case is slidable with respect to the first component member.

10 Claims, 9 Drawing Sheets

(58) Field of Classification Search
USPC .............. 296/97.9, 97.11, 97.12, 97.13, 97.1
See application file for complete search history.

(56) References Cited

U.S. PATENT DOCUMENTS

| | | | | |
|---|---|---|---|---|
| 5,409,285 A * | 4/1995 | Snyder | ................... | B60J 3/0239 |
| | | | | 296/97.11 |
| 5,653,490 A * | 8/1997 | Fink | ....................... | B60J 3/0239 |
| | | | | 296/97.11 |
| 5,765,899 A * | 6/1998 | Watjer | ................... | B60J 3/0239 |
| | | | | 296/97.11 |
| 6,010,174 A * | 1/2000 | Murdock | ............... | B60J 3/0239 |
| | | | | 296/97.11 |
| 6,220,644 B1 * | 4/2001 | Tiesler | ................... | B60J 3/0282 |
| | | | | 296/97.11 |
| 6,435,593 B2 * | 8/2002 | Welter | ................... | B60Q 3/252 |
| | | | | 296/97.11 |
| 6,962,385 B2 * | 11/2005 | Wieczorek | ............. | B60J 3/0204 |
| | | | | 296/97.11 |
| 7,798,551 B2 * | 9/2010 | Okazaki | ................. | B60J 3/0265 |
| | | | | 296/97.11 |
| 7,823,954 B2 * | 11/2010 | Jones | ..................... | B60J 3/0278 |
| | | | | 296/97.11 |
| 8,333,422 B2 * | 12/2012 | Ogawa | ................... | B60J 3/0239 |
| | | | | 296/97.11 |
| 8,905,457 B2 * | 12/2014 | Mertz | .................... | B60J 3/0265 |
| | | | | 296/97.11 |
| 10,336,165 B2 * | 7/2019 | Nedelman | ............. | B60J 3/0239 |
| 10,864,804 B2 * | 12/2020 | Huff | ....................... | B60J 3/0239 |
| 11,130,390 B2 * | 9/2021 | Wu | ........................ | B60J 3/0278 |
| 2017/0174051 A1 * | 6/2017 | Welter | ................... | B60J 3/0234 |
| 2020/0282810 A1 * | 9/2020 | Huff | ....................... | B60J 3/0239 |

FOREIGN PATENT DOCUMENTS

| | | |
|---|---|---|
| JP | 2011-042335 A | 3/2011 |
| JP | 2013-252739 A | 12/2013 |

OTHER PUBLICATIONS

Oct. 13, 2020 Written Opinion of the International Searching Authority issued in International Patent Application No. PCT/JP2020/032024.

* cited by examiner

VEHICLE SUN VISOR

TECHNICAL FIELD

The invention relates to a sliding-type vehicle sun visor that is provided in a vehicle and that includes a visor body capable of moving in a long-axis direction of a support shaft.

BACKGROUND ART

A vehicle sun visor disclosed in each of Patent Documents 1 and 2 has a plate-type visor body and a support shaft that supports the visor body such that the visor body is turnable. The visor body turns between a service position along a windshield and a storage position along a ceiling, by turning around the support shaft. A sliding mechanism for making the visor body slidable along the support shaft is provided in the visor body. The visor body can be slid with respect to the support shaft in a longitudinal direction of the visor body, through the use of the sliding mechanism. The visor body disclosed in Patent Document 1 has a front shell body and a back shell body. A bearing portion is slidably attached to a sliding rail provided in the visor body. An end portion of the support shaft is fitted to the bearing portion. The sliding rail is held by being screwed to the back shell body.

The visor body disclosed in Patent Document 2 is constituted by two split bodies. A support is slidably fitted to guide rails formed in the visor body. The end portion of the support shaft is fitted to the support. Each of the guide rails protrudes from an inner wall of one of the two split bodies toward the other split body. Each of the guide rails extends in a direction in which the support shaft extends. An engagement strip that is a spring strip is formed on a lateral wall of the support. When the support moves along the guide rails, the engagement strip moves while abutting on the guide rails, and the posture of the support with respect to the visor body is thereby held.

PRIOR ART DOCUMENTS

Patent Documents

Patent Document 1: Japanese Unexamined Patent Application Publication No. 2013-252739 (JP 2013-252739 A)
Patent Document 2: Japanese Unexamined Patent Application Publication No. 2010-173385 (JP 2010-173385 A)

SUMMARY OF THE INVENTION

Problem to be Solved by the Invention

According to Patent Document 1, the sliding rail and the back shell body are screwed to the front shell body. That is, the visor body is provided with the sliding rail that is a separate body, and the sliding rail is screwed. Therefore, there are a large number of parts, and considerable man-hours are required for assembly, so the cost of manufacturing may become high.

According to Patent Document 2, the support needs to be fitted in a certain posture at a predetermined position between the two split bodies. However, in molding the split bodies, the split bodies may thermally deform due to, for example, the heat at the time of molding and differ in shape from each other. In such a case, the fitting of the support and the like is not easy. Accordingly, there have been demands for a sliding mechanism for a sun visor that requires a small number of parts and small man-hours and that ensures easy assembly.

Means for Solving the Problem

According to one feature of the present disclosure, a vehicle sun visor includes a visor body that includes a first component member and a second component member that are stacked in a thickness direction. A support shaft is inserted into the visor body to support the visor body such that the visor body is turnable between a service position and a storage position. In the visor body, a case that supports the support shaft such that the support shaft is turnable is provided, the case being slidably fitted to the visor body. The case is provided with a clip that urges the visor body toward the storage position by urging the support shaft. A guide rail that prevents the case from falling in the thickness direction with respect to the first component member is provided. The guide rail is formed integrally with the first component member to support the case such that the case is slidable with respect to the first component member.

Accordingly, the case is supported by the visor body only via the guide rail formed integrally with the first component member. Therefore, a separate rail or the like is not required, and a process of screwing the rail or the like to the visor body is not required either. It is thus possible to manufacture the visor at low cost. The guide rail prevents the case from falling in the thickness direction with respect to the first component member. Therefore, the case is held in a certain posture only by the first component member. Therefore, the case can be held in a more stable posture than a case held between the first component member and the second component member. The posture of the case can be kept from being influenced by, for example, an assembling error of the first component member and the second component member or variations in size of the respective parts. Moreover, the rigidity of the first component member is enhanced, and the structure of the visor body can be simplified, by concentrating function and structure on the first component member while simplifying the structure of the second component member. As a result, the cost of manufacturing the sun visor can be reduced.

According to one feature of the present disclosure, the guide rail has a first rail and a second rail. The first rail supports a first end edge portion of the case such that the first end edge portion is slidable. The second rail supports a second end edge portion of the case that is located opposite to the first end edge portion such that the second end edge portion is slidable. The first rail and the second rail are formed integrally with the first component member. Accordingly, both upper and lower ends of the case in a sliding direction are supported on the first component member, so a sliding load is stably held by the first component member.

According to one feature of the present disclosure, the case has a first end edge portion that engages with the guide rail. The guide rail has at least one cut portion into which the first end edge portion is insertable in the thickness direction of the first component member. The guide rail has a guide rail body that is long in a sliding direction. The guide rail body is able to be engaged with the first end edge portion of the case such that the first end edge portion is slidable and is unable to fall in the thickness direction of the visor body. Accordingly, the case is attached to the guide rail by inserting the first end edge portion into the at least one cut portion of the guide rail. Therefore, the case can be easily attached to the guide rail without deforming the guide rail.

According to one feature of the present disclosure, the second component member has a stopper that protrudes from the second component member toward an end portion of the guide rail on the first component member and keeps the first end edge portion from disengaging from the at least one cut portion of the guide rail in a state in which the second component member is attached to the first component member. Accordingly, when the case is fitted to the guide rail, the first end edge portion of the case is first inserted into the at least one cut portion. The case is slid with respect to the guide rail to separate the first end edge portion from the at least one cut portion. The second component member is attached to the first component member in that state. The stopper of the second component member keeps the first end edge portion of the case from disengaging from the at least one cut portion of the guide rail. Therefore, the case is prevented from falling from the guide rail after being fitted to the guide rail.

According to one feature of the present disclosure, the first end edge portion has a first engagement portion and a second engagement portion on a straight line parallel to the sliding direction of the case. The first engagement portion is formed at or in vicinity of a first end portion of the case in the sliding direction and has a first width in the sliding direction. The second engagement portion is formed at or in vicinity of a second end portion on an opposite end side with respect to the first end portion and has a second width in the sliding direction narrower than the first width. The at least one cut portion of the guide rail includes a first cut portion and a second cut portion. The first cut portion has a width in the sliding direction wider than the first width, and the first engagement portion is insertable into the first cut portion in the thickness direction. The second cut portion has a width in the sliding direction narrower than the first width and wider than the second width, and the second engagement portion is insertable into the second cut portion in the thickness direction.

Accordingly, the case can be attached to the guide rail at an attachment position that allows the first engagement portion to be inserted from the first cut portion and that allows the second engagement portion to be inserted from the second cut portion. The width of the first engagement portion is wider than the width of the second cut portion and hence the first engagement portion does not disengage from the second cut portion. Accordingly, even when the case separates from the attachment position and the first engagement portion reaches the second cut portion, the case does not disengage from the guide rail. Besides, the direction in which the case is fitted is visually recognizable from the two cut portions that are different in width from each other, so the case is not assembled in the opposite direction.

According to one feature of the present disclosure, the first cut portion is formed at an end portion in a first sliding direction in a sliding region of the guide rail on which the case slides. The first engagement portion is formed at or in vicinity of the first end portion of the case in the first sliding direction. The second component member has a stopper that protrudes from the second component member toward the end portion of the guide rail in the first component member and keeps the first end edge portion from disengaging from the cut portion of the guide rail, in a state in which the second component member is attached to the first component member.

Accordingly, when the case is attached to the guide rail, a projection portion or a recess portion at the second end edge portion of the case is arranged in or on a recess portion or a projection portion provided in or on the second rail that supports the projection portion or the recess portion at the second end edge portion of the case in a slidable manner. Furthermore, the first engagement portion and the second engagement portion that are formed at the first end edge portion of the case are inserted into the first cut portion and the second cut portion of the first rail that support the first engagement portion and the second engagement portion respectively in a slidable manner. The case is slid with respect to the guide rail such that the first engagement portion moves to a position away from the first cut portion. In this state, the second component member is attached to the first component member. Thus, the stopper can prevent the first engagement portion from returning to the position of the first cut portion. Thus, the first end edge portion of the case can be prevented from falling from the cut portions after the second component member is fitted to the first component member.

MODES FOR CARRYING OUT THE INVENTION

Figure 1:
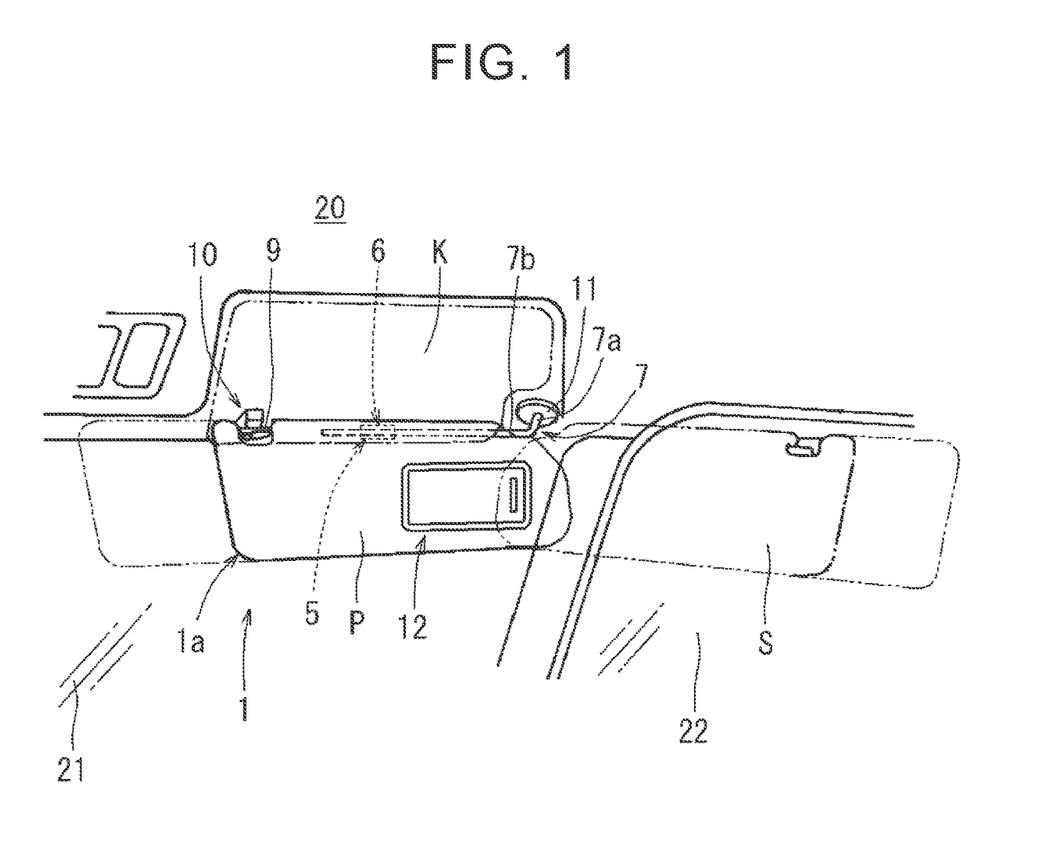
FIG. 1 is a perspective view showing the configuration of a vehicle sun visor regarding the carrying out of the present invention.

One embodiment of the present invention will be described using FIG. 1 and FIG. 2. As shown in FIG. 1, a vehicle sun visor 1 is fitted to a ceiling surface 20 near a windshield 21 in a vehicle cabin. The vehicle sun visor 1 includes a visor body 1*a*, and a mirror unit 12 provided on one surface of the visor body 1*a*. A support shaft 7 that supports the visor body 1*a* such that the visor body 1*a* is turnable is fitted to the visor body 1*a* via a clip 6 fitted to a case 5. The visor body 1*a* supports the support shaft 7 such that the support shaft 7 is turnable. The case 5 is slidably fitted to the visor body 1*a* of the vehicle sun visor.

As shown in FIGS. 1 to 7, the visor body 1*a* is substantially rectangular, and includes a first component member 2 and a second component member 3 that are in the shape of a flat plate and that are stacked in a thickness direction. A surface of the visor body 1*a* is covered with a skin 13. The support shaft 7 is a substantially L-shaped rod. A vertical support shaft 7*a* extends upward from a distal end of a lateral support shaft 7*b*, and substantially perpendicularly to the lateral support shaft 7*b*. A bracket 11 is fitted to a distal end of the vertical support shaft 7a. The bracket 11 is attached to the ceiling surface 20 in the vehicle cabin. The lateral support shaft 7b is inserted along an upper side of the visor body 1a from a side of the visor body 1a. A slotted surface 7h provided on a small-diameter portion 7d of the support shaft is inserted through an opening portion 5f of the case 5 and an opening portion 6a of the clip 6, and is fitted to a clip pressing portion 6b.

Figure 2:
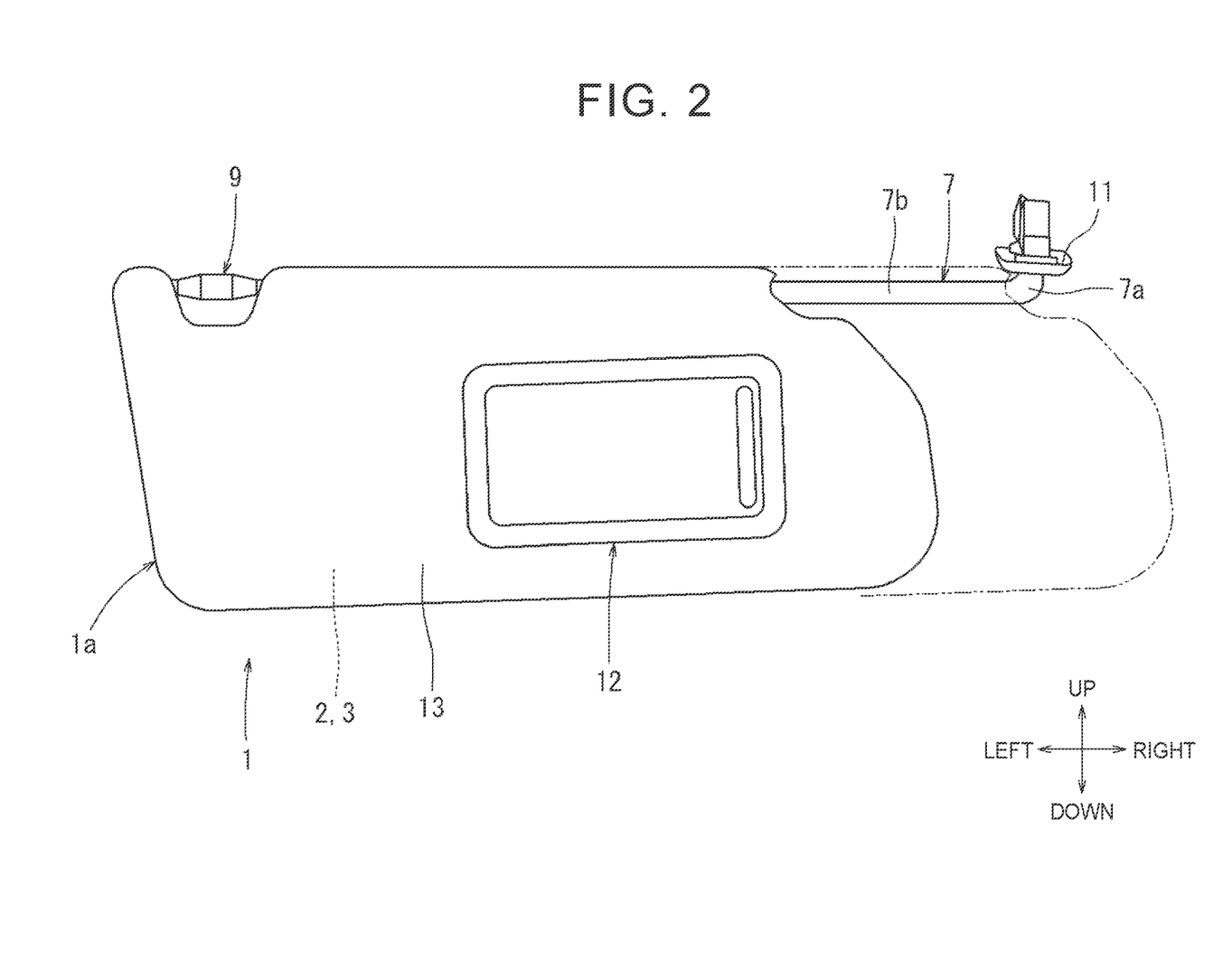
FIG. 2 is a front view of the sun visor in a sliding state.

As shown in FIG. 1 and FIG. 2, a shaft 9 is substantially in the shape of a circular cylinder, and is removably held by a hook 10 fixed to the ceiling surface 20. By attaching the shaft 9 to the hook 10, the visor body 1a turns between a service position P along the windshield 21 and a storage position K along the ceiling surface 20 with the shaft 9 and the lateral support shaft 7b serving as an axial center. Besides, by removing the shaft 9 from the hook 10, the visor body 1a can turn around the vertical support shaft 7a. Thus, the visor body 1a turns between the service position P along the windshield 21 and a side position S along a side glass 22.

Figure 3:
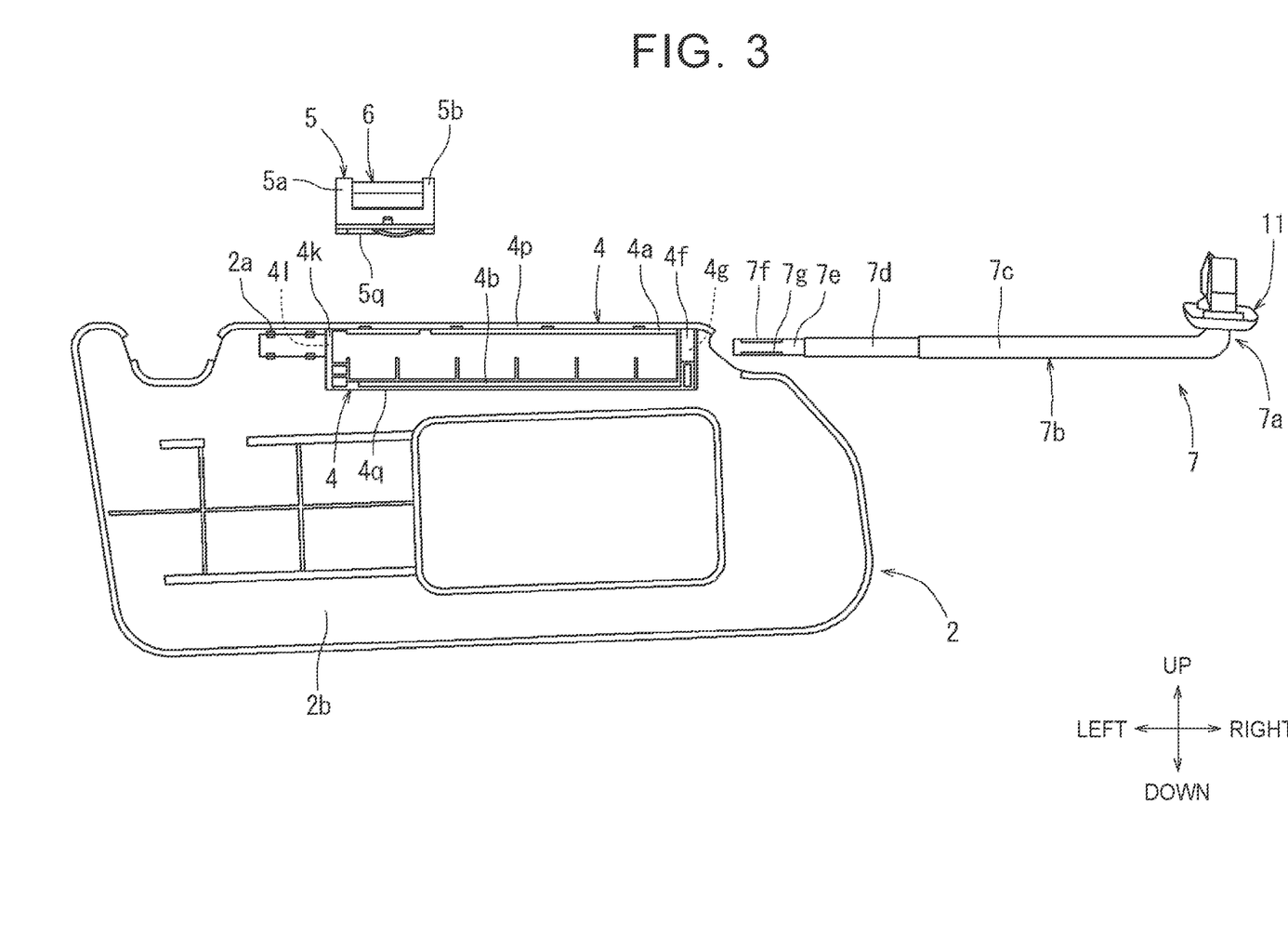
FIG. 3 is an exploded front view for a sliding structure of the sun visor.
Figure 4:
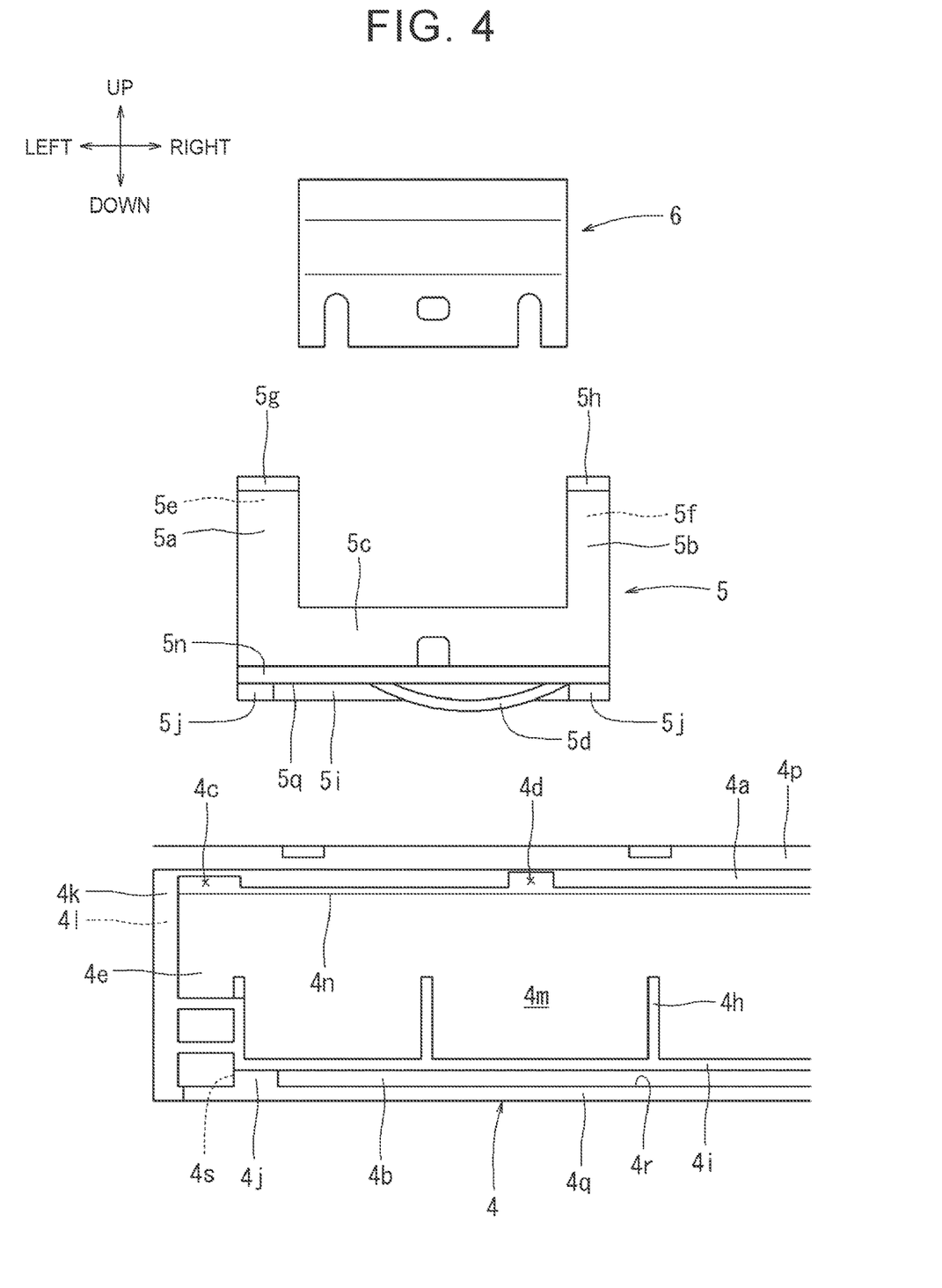
FIG. 4 is an exploded front view of a clip, a case, and a part of a guide rail for the visor body.
Figure 9:
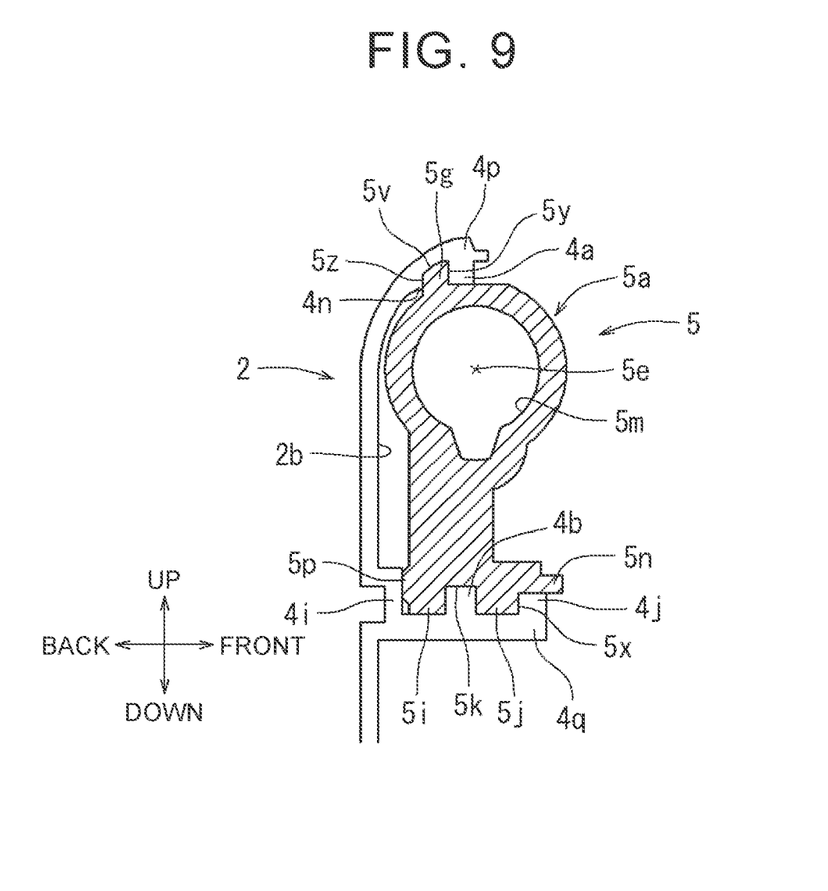
FIG. 9 is a cross-sectional view along a line defined by arrows IX and IX of FIG. 8.

As shown in FIG. 2 and FIG. 3, a guide rail 4 that supports the case 5 such that the case 5 is slidable is provided on an inner surface 2b of the first component member 2 to slide the visor body 1a along the lateral support shaft 7b. The guide rail 4 is substantially in the shape of a rectangle. As shown in FIGS. 3 and 4, the guide rail 4 has a first rail 4a that protrudes downward from a visor upper edge 4p of the first component member 2. The guide rail 4 has a plate-shaped base portion 4q at a position corresponding to a base of the rectangle. The base portion 4q protrudes substantially vertically from the inner surface 2b of the first component member 2. As shown in FIGS. 4 and 9, a second rail 4b that extends in parallel with the first rail 4a is formed in a protruding manner on an upper surface 4r of the base portion 4q. The case 5 is slidably supported by the first rail 4a and the second rail 4b.

Figure 7:
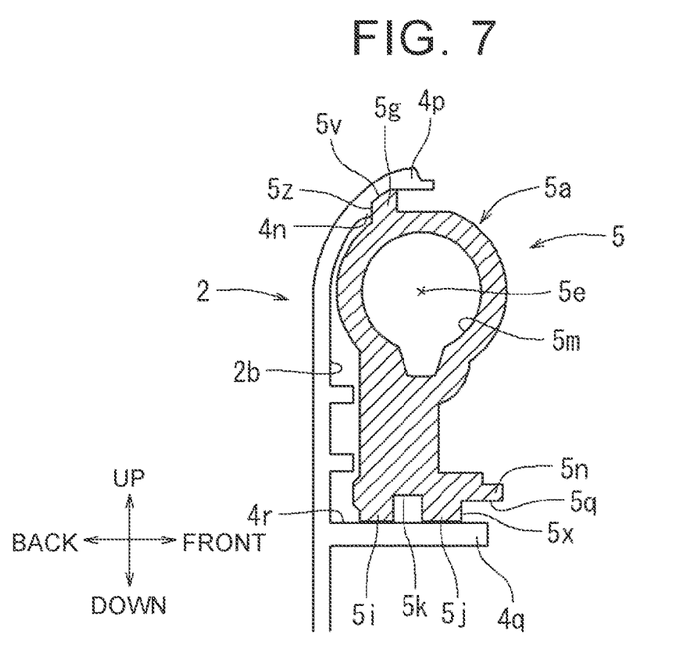
FIG. 7 is a cross-sectional view along a line defined by arrows VII and VII of FIG. 6.

As shown in FIG. 4, FIG. 7, and FIG. 9, the second rail 4b protrudes from the base portion 4q toward the first rail 4a. A region 4m between the visor upper edge 4p and the base portion 4q is long in a longitudinal direction of the visor body 1a, and allows the case 5 to slide in a lateral direction. The region 4m is provided with a protrusion portion 4n that protrudes from the visor upper edge 4p and that extends in the longitudinal direction, and a plurality of vertical reinforcing portions 4h. A slide support portion 4i that protrudes inwardly of the first component member 2 is formed at a connecting part of the first component member 2 and the base portion 4q. The slide support portion 4i extends in the lateral direction parallel to the second rail 4b or the base portion 4q.

As shown in FIG. 4 and FIG. 7, the protrusion portion 4n is located on a back side with respect to a first end edge portion (a first engagement portion 5g and a second engagement portion 5h) of the case 5, and extends in parallel with the first rail 4a. As shown in FIG. 9, the protrusion portion 4n cooperates with the first rail 4a to support the first end edge portion such that the first end edge portion is slidable. More specifically, the protrusion portion 4n supports a back surface 5z of the first end edge portion, and the first rail 4a supports a front surface 5y of the first end edge portion.

Figure 10:
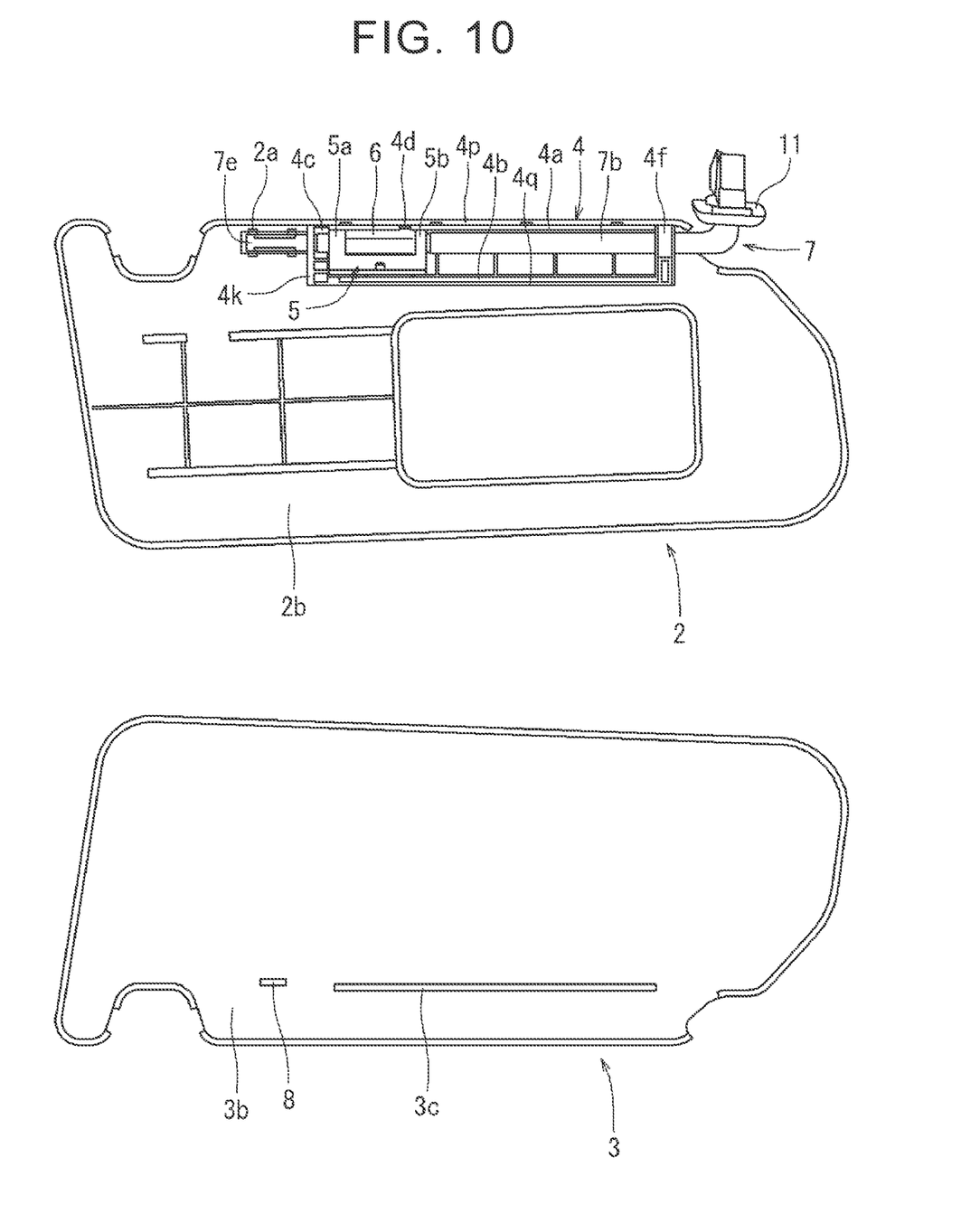
FIG. 10 is an exploded view of a vehicle sun visor showing an embodiment of FIG. 9.

The small-diameter portion 7d of the lateral support shaft 7b shown in FIG. 3 is held via the clip 6 fitted to the case 5 provided on the guide rail 4 (see FIG. 10). The lateral support shaft 7b is slidably supported by an inlet reception portion 4f formed at a right-end position of the guide rail 4. The inlet reception portion 4f has an opening portion 4g into which a large-diameter portion 7c of the lateral support shaft 7b can be inserted. The lateral support shaft 7b is thus held via the inlet reception portion 4f provided on the first component member 2 and the clip 6 fitted to the case 5.

Figure 11:
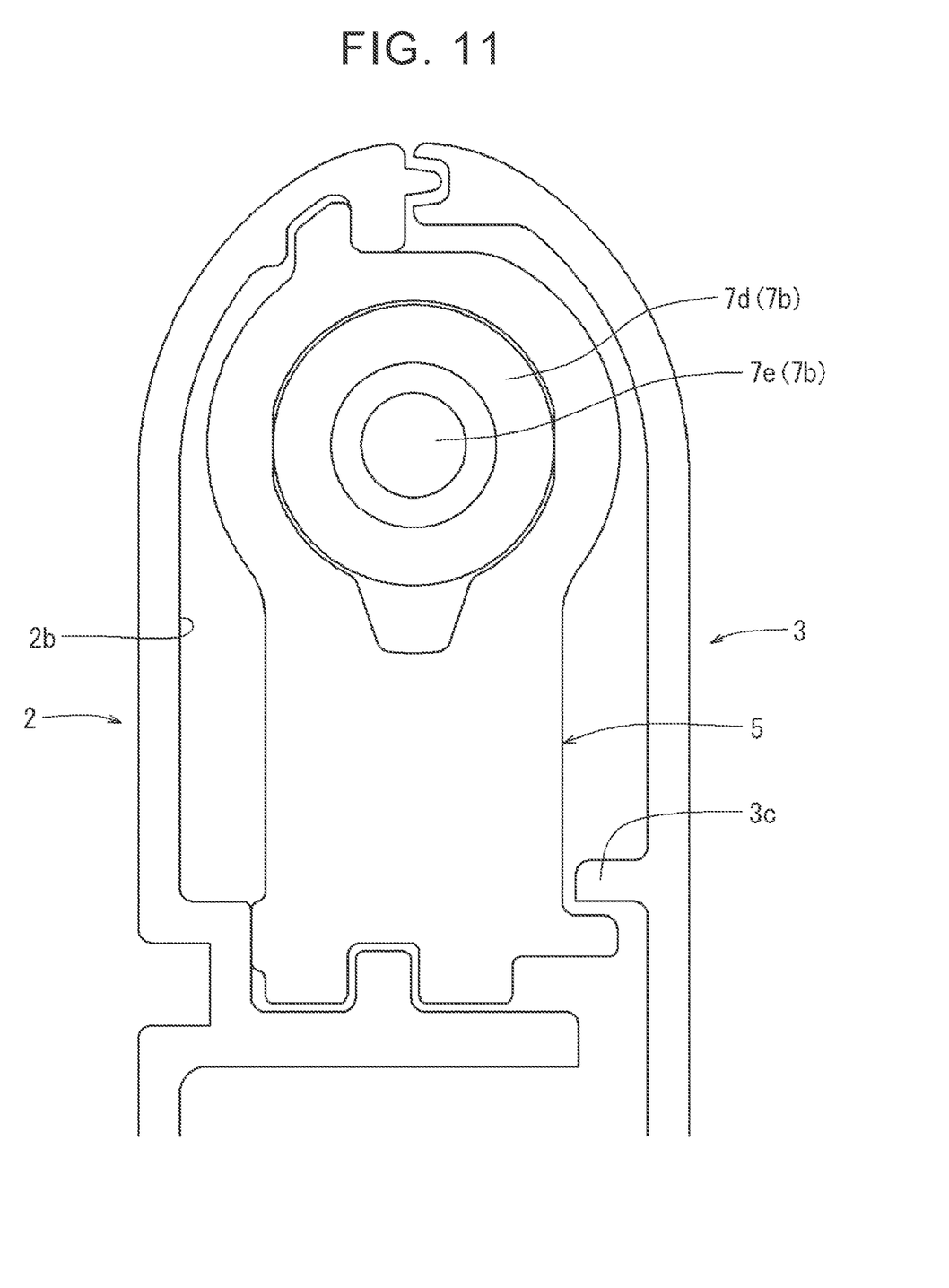
FIG. 11 is a partially enlarged cross-sectional view of the sun visor in an assembled state.

As shown in FIG. 3 and FIG. 11, an innermost wall portion 4k is provided at a left-end position of the guide rail 4. The innermost wall portion 4k has an opening portion 4l that is smaller in diameter than the small-diameter portion 7d of the lateral support shaft 7b. A plurality of terminals 2a are provided at a position to the left of the innermost wall portion 4k. For example, two of the terminals 2a are aligned in the lateral direction at positions above the lateral support shaft 7b. The other two terminals 2a are aligned in the lateral direction at positions below the lateral support shaft 7b. As shown in FIG. 10, a distal end portion 7e of the support shaft 7 is inserted into the positions where the terminals 2a are provided. When the visor body 1a is located at the service position P in this state, terminal portions 7f and 7g of the support shaft 7 are in contact with the terminals 2a of the visor body 1a. When the visor body 1a is located at the storage position K, the terminal portions 7f and 7g are away from the terminals 2a.

Figure 5:
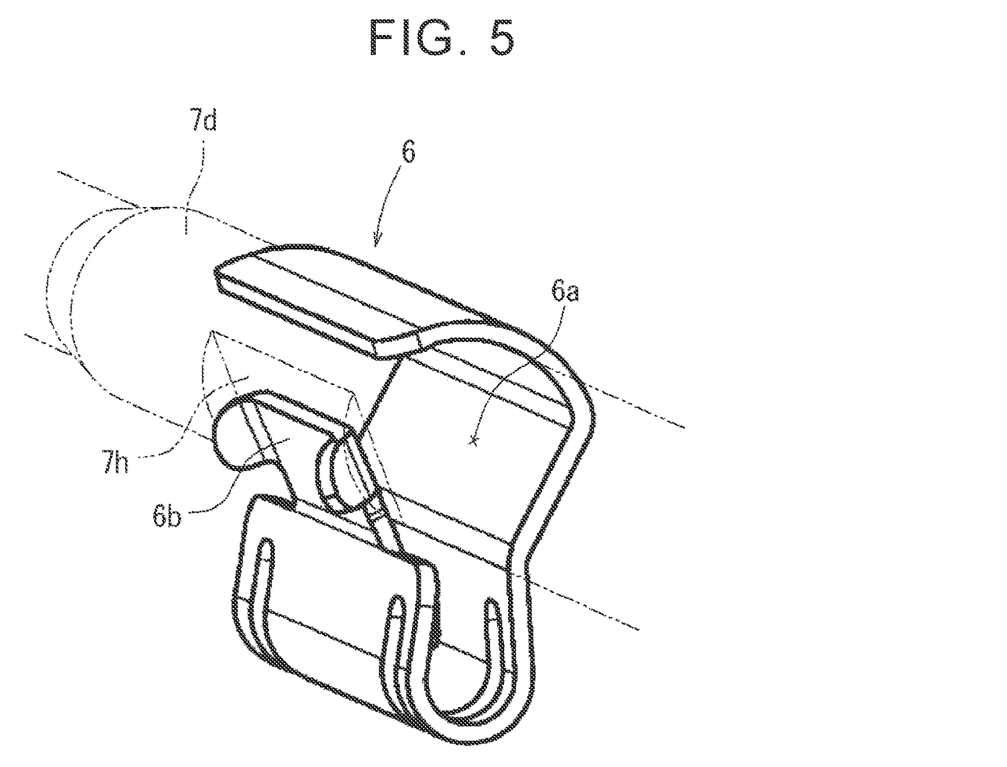
FIG. 5 is a perspective view as viewed from a back side of the clip.

As shown in FIG. 4 and FIG. 5, the clip 6 is formed by bending an integral leaf spring, and grips the small-diameter portion 7d of the support shaft 7 along a circumferential direction thereof at three points. The clip 6 urges and holds the turning of the visor body 1a between the service position P along the windshield 21 and the storage position K along the ceiling surface 20, around the small-diameter portion 7d. After the clip 6 is fitted into the case 5, the small-diameter portion 7d of the support shaft is inserted into and fitted to the clip 6.

As shown in FIG. 3 and FIG. 4, the case 5 accommodates the clip 6. The case 5 can slide with respect to the guide rail 4. The case 5 has a left vertical wall portion 5a, a right vertical wall portion 5b, and a clip holding portion 5c that connects lower portions of both the vertical wall portions 5a and 5b. The case 5 is formed of, for example, resin. Both the vertical wall portions 5a and 5b are located apart from each other in the longitudinal direction of the first component member 2. The vertical wall portion 5a is larger in width than the vertical wall portion 5b in a sliding direction.

As shown in FIG. 4 and FIG. 7, head portions of the vertical wall portions 5a and 5b provided at both left and right end portions of the case 5 respectively are substantially in the shape of a circular cylinder. As shown in FIG. 4, the head portions of the vertical wall portions 5a and 5b are respectively provided with the first and second engagement portions 5g and 5h that protrude upward. Distal end surfaces 5v of the first and second engagement portions 5g and 5h are formed in a tapered manner along the inner surface 2b of the first component member 2. Opening portions 5e and 5f that are substantially circular in cross-section and have inner peripheral surfaces 5m are formed in the vertical wall portions 5a and 5b respectively.

Figure 8:
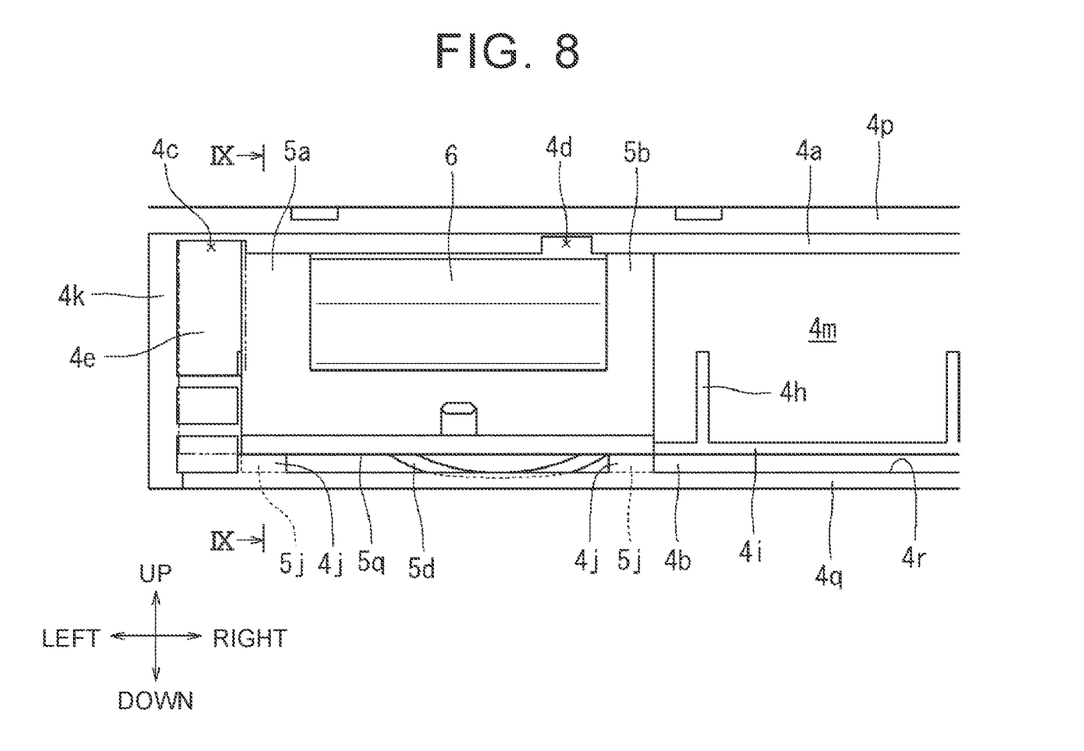
FIG. 8 is an enlarged front view of a state where the case has been slid rightward from a position of FIG. 6.

As shown in FIG. 4 and FIG. 8, an elastic strip 5d that elastically abuts on the upper surface 4r of the base portion 4q and that imparts friction resistance thereto is formed on a bottom surface 5q of the case 5. The elastic strip 5d is formed of, for example, resin. The elastic strip 5d is in the shape of a circular arc in a front view. Bottom surface projection portions 5j are formed at both left and right end portions of the bottom surface 5q respectively.

Figure 6:
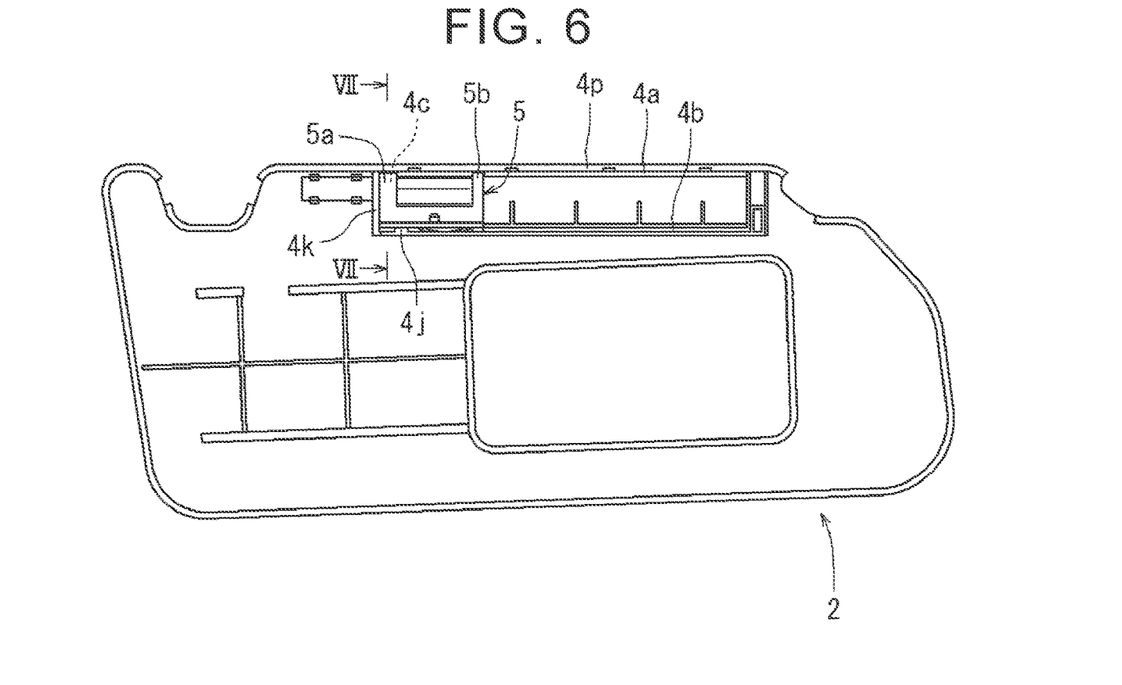
FIG. 6 is a front view of a first component member of the sun visor, and the case and the clip that have been inserted into the guide rail.

As shown in FIG. 4 and FIG. 6, the first rail 4a is provided with an innermost-side cut portion 4c and an inlet-side cut portion 4d such that the case 5 can be fitted to the guide rail 4. The innermost-side cut portion 4c is located at a left end of the guide rail 4, and is located between a left end of the first rail 4a and the innermost wall portion 4k. The innermost-side cut portion 4c is wider in lateral width than the first engagement portion 5g formed at the first end edge portion of the case 5, and allows the first engagement portion 5g to be inserted into the guide rail 4.

As shown in FIG. 4, the inlet-side cut portion 4d is located apart from and to the right of the innermost-side cut portion 4c. The inlet-side cut portion 4d has a lateral width wider than that of the second engagement portion 5h formed at the first end edge portion of the vertical wall portion 5b of the case 5, and allows the second engagement portion 5h to be inserted into the guide rail 4. The inlet-side cut portion 4d has the lateral width narrower than that of the first engagement portion 5g of the case 5. Accordingly, when the first engagement portion 5g is located at the inlet-side cut portion 4d, the first engagement portion 5g is prevented from disengaging from the inlet-side cut portion 4d.

As shown in FIG. 4, a stopper accommodation region 4e is formed at a left end portion of the guide rail 4. The stopper accommodation region 4e is located below the innermost-side cut portion 4c, and accommodates a stopper 8 (see FIG. 10) of the second component member 3 when the first component member 2 and the second component member 3 are stacked in the thickness direction and fitted to each other. As shown in FIG. 10, the stopper 8 is provided on the second component member 3 to keep the case 5 from moving leftward with respect to the guide rail 4. The stopper 8 is in the shape of, for example, a quadrangular prism, and protrudes from an inner surface 3b of the second component member 3. As shown in FIG. 4 and FIG. 10, a fall prevention protrusion 4j that extends in parallel with the second rail 4b from a position near a left end 4s of the second rail 4b is provided on the upper surface 4r of the base portion 4q. A plurality of fall prevention protrusions 4j may be provided on the upper surface 4r as shown in FIG. 8. As shown in FIG. 8 and FIG. 9, each of the fall prevention protrusions 4j abuts on a horizontal bulge portion 5n and prevents the case 5 from falling from the guide rail 4 when the case 5 is fitted to the guide rail 4.

In the case where the case 5 is fitted to the guide rail 4, a lower portion (the second end edge portion) of the case 5 is first engaged with the second rail 4b of the guide rail 4 as shown in FIG. 4, FIG. 6, and FIG. 10. More specifically, the elastic strip 5d, a lower rail projection portion 5i, and the respective bottom surface projection portions 5j of the case 5 are passed above the fall prevention protrusion 4j and placed in such a manner as to be in contact with the upper surface 4r of the base portion 4q. Subsequently, an upper portion (the first end edge portion) of the case 5 is engaged with the first rail 4a of the guide rail 4. More specifically, the first engagement portion 5g formed at the first end edge portion of the vertical wall portion 5a of the case 5 is inserted into the innermost-side cut portion 4c as shown in FIG. 7 and FIG. 8. At the same time, the second engagement portion 5h formed at the first end edge portion is inserted into the inlet-side cut portion 4d. The first engagement portion 5g and the second engagement portion 5h of the case 5 are then caused to abut on the protrusion portion 4n. The case 5 is thus fitted to the guide rail 4.

Subsequently, the case 5 is slid rightward after being fitted to the guide rail 4 as shown in FIG. 4 and FIG. 8. Thus, the first engagement portion 5g of the case 5 separates from the innermost-side cut portion 4c of the guide rail 4 as shown in FIG. 8. Furthermore, the first engagement portion 5g and the second engagement portion 5h that are formed at the first end edge portion of the case 5 are held between the first rail 4a and the protrusion portion 4n as shown in FIG. 10. The second rail 4b is then held between the elastic strip 5d of the case 5 and the lower rail projection portion 5i. The case 5 is thus attached to the guide rail 4 without being elastically deformed.

As shown in FIG. 8 and FIG. 9, a front surface 5x of the bottom surface projection portion 5j at one end portion of the case 5 abuts on the fall prevention protrusion 4j, or front surfaces 5x of the bottom surface projection portions 5j at both ends of the case 5 abut on the fall prevention protrusions 4j respectively. The case 5 thus cooperates with the second rail 4b, and hence can be held more securely. A back surface protrusion portion 5p of the case 5 abuts on the slide support portion 4i. Accordingly, when the visor body 1a rotates between the service position P and the storage position K, the back surface protrusion portion 5p keeps the case 5 from moving in the thickness direction with respect to the second rail 4b.

Subsequently, the lateral support shaft 7b is inserted along the guide rail 4 from the opening portion 4g of the inlet reception portion 4f as shown in FIG. 3 and FIG. 10. The lateral support shaft 7b extends through the opening portions 5e and 5f (see FIG. 4) of the case 5, the opening portion 6a of the clip 6, and the opening portion 4l of the innermost wall portion 4k. Finally, the second component member 3 is disposed on the first component member 2 in the thickness direction and attached thereto, as shown in FIG. 11. The first component member 2 and the second component member 3 are coupled to each other via, for example, a coupling pin or the like.

At this time, the stopper 8 provided on the inner surface 3b of the second component member 3 abuts on the stopper accommodation region 4e of the first component member 2. The vertical wall portion 5a of the case 5 can thus be prevented from reaching the innermost-side cut portion 4c. Besides, a protrusion portion 3c that protrudes toward the case 5 is provided on the inner surface 3b as shown in FIG. 10 and FIG. 11. The protrusion portion 3c can keep the case 5 from moving in the thickness direction and in an up-down direction. Thus, after the second component member 3 is fitted to the first component member 2, the case 5 can be prevented from falling from the innermost-side cut portion 4c and the inlet-side cut portion 4d.

As described above, the vehicle sun visor 1 includes the visor body 1a that includes the first component member 2 and the second component member 3 that are stacked in the thickness direction as shown in FIG. 1, FIG. 2, and FIG. 10. The support shaft 7 is inserted into the visor body 1a, and supports the visor body 1a such that the visor body 1a is turnable between the service position P and the storage position K. As shown in FIG. 3 and FIG. 7, the case 5 that supports the support shaft 7 such that the support shaft 7 is turnable and that is slidably fitted to the visor body 1a is provided in the visor body 1a. The case 5 is provided with the clip 6 that urges the visor body 1a toward the storage position K by urging the support shaft 7. The guide rail 4 that prevents the case 5 from falling in the thickness direction with respect to the first component member 2 is provided. The guide rail 4 is formed integrally with the first component member 2 so as to support the case 5 such that the case 5 is slidable with respect to the first component member 2.

Accordingly, the case 5 is supported by the visor body 1a only via the guide rail 4 formed integrally with the first component member 2. Therefore, a separate rail or the like is not required, and a process of screwing a rail or the like to the visor body 1a is not required either. Thus, the sun visor 1 can be manufactured at low cost. The guide rail 4 prevents the case 5 from falling in the thickness direction with respect to the first component member 2. Therefore, the case 5 is held in a certain posture only by the first component member 2. Therefore, the case 5 can be held in a stable posture as compared to the case 5 held between the first component member 2 and the second component member 3. For example, the posture of the case 5 can be kept from being influenced by, for example, an assembling error of the first component member 2 and the second component member 3 or variations in size of the respective parts. Moreover, the rigidity of the first component member 2 is enhanced, and the structure of the visor body 1a can be simplified, by simplifying the structure of the second component member 3 and concentrating function and structure on the first component member 2. As a result, the cost of manufacturing the sun visor 1 can be reduced.

As shown in FIG. 3 and FIG. 4, the guide rail 4 has the first rail 4a and the second rail 4b. The first rail 4a supports the first engagement portion 5g and the second engagement portion 5h formed at the first end edge portion of the case 5 such that the first engagement portion 5g and the second engagement portion 5h are slidable. The second rail 4b supports the second end edge portion (5i, 5k, 5j) of the case 5 located opposite to the first end edge portion such that the second end edge portion (5i, 5k, 5j) is slidable. The first rail 4a and the second rail 4b are formed integrally with the first component member 2. Accordingly, both upper and lower ends of the case 5 in the sliding direction are supported by the first component member 2, so a sliding load is stably held by the first component member 2.

As shown in FIG. 4 and FIG. 10, the case 5 has the first engagement portion 5g and the second engagement portion 5h that are formed at the first end edge portion engaging the guide rail 4, and the second end edge portion. The guide rail 4 has the guide rail bodies (4a, 4b) that are long in the sliding direction. The first engagement portion 5g and the second engagement portion 5h formed at the first end edge portion of the case 5 can engage with the guide rail body such that the first engagement portion 5g and the second engagement portion 5h are slidable and are unable to fall in the thickness direction of the visor body 1a. Furthermore, the cut portions (4c, 4d) into which the first engagement portion 5g and the second engagement portion 5h that are formed at the first end edge portion can be inserted in the thickness direction of the visor body 1a respectively are formed in the guide rail 4.

Accordingly, the case 5 is attached to the guide rail 4 by inserting the first engagement portion 5g and the second engagement portion 5h that are formed at the first end edge portion from the cut portions (4c, 4d) of the guide rail 4 respectively. Therefore, the case 5 can be easily attached to the guide rail 4 without deforming the guide rail 4.

As shown in FIG. 10 and FIG. 11, the second component member 3 has the stopper 8 that keeps the first engagement portion 5g and the second engagement portion 5h that are formed at the first end edge portion from reaching the cut portions (4c, 4d) of the guide rail 4 respectively, in a state in which the second component member 3 is attached to the first component member 2. Accordingly, when the case 5 is fitted to the guide rail 4, the first engagement portion 5g and the second engagement portion 5h that are formed at the first end edge portion of the case 5 are first inserted into the cut portions (4c, 4d) respectively. The case 5 is slid with respect to the guide rail 4 to separate the first engagement portion 5g and the second engagement portion 5h that are formed at the first end edge portion from the cut portions (4c, 4d) respectively. The second component member 3 is attached to the first component member 2 in that state. The first engagement portion 5g and the second engagement portion 5h that are formed at the first end edge portion of the guide rail 4 are kept from reaching the cut portions (4c, 4d) respectively, by the stopper 8 of the second component member 3. Therefore, the case 5 is prevented from falling from the guide rail 4 after the case 5 is fitted to the guide rail 4.

As shown in FIG. 4, the first end edge portion has the first engagement portion 5g and the second engagement portion 5h on a straight line parallel to the sliding direction of the case 5. The first engagement portion 5g is formed at or in vicinity of a first end portion of the case 5 in the sliding direction, and has a first width. The second engagement portion 5h is formed at or in vicinity of a second end portion that is on an opposite end side with respect to the first end portion, and has a second width that is narrower than the first width in the sliding direction. The cut portions of the guide rail 4 include the first cut portion 4c and the second cut portion 4d. The first cut portion 4c has a width in the sliding direction wider than the first width, and the first engagement portion 5g can be inserted into the first cut portion 4c in the thickness direction. The second cut portion 4d has a width in the sliding direction narrower than the first width and wider than the second width, and the second engagement portion 5h can be inserted into the second cut portion 4d in the thickness direction.

Accordingly, the case 5 can be attached to the guide rail 4 at an attachment position that allows the first engagement portion 5g to be inserted from the first cut portion 4c and that allows the second engagement portion 5h to be inserted from the second cut portion 4d. The first engagement portion 5g has a width wider than that of the second cut portion 4d and hence does not disengage from the second cut portion 4d. Accordingly, even when the case 5 separates from the attachment position and the first engagement portion 5g reaches the second cut portion 4d, the case 5 does not disengage from the guide rail 4. Besides, the direction in which the case 5 is fitted is visually recognizable from the two cut portions that are different in width from each other, so the case 5 is not fitted in the opposite direction.

As shown in FIG. 4 and FIG. 10, the first cut portion 4c is formed at an end portion in a first sliding direction in the sliding region 4m in the guide rail 4 on which the case 5 slides. The first engagement portion 5g is formed at or in vicinity of the first end portion of the case 5 in the first sliding direction. The second component member 3 has the stopper 8 that protrudes from the second component member 3 toward the end portion of the guide rail 4 on the first component member 2 and that keeps the first end edge portion from disengaging from the cut portions (4c, 4d) of the guide rail 4, in the state in which the second component member 3 is attached to the first component member 2. The stopper 8 is in the shape of, for example, a quadrangular prism.

Accordingly, when the case 5 is attached to the guide rail 4, a projection or recess portion of the second end edge portion of the case is arranged in or on a recess or projection portion provided in or on the second rail 4b, and furthermore, the first engagement portion 5g and the second engagement portion 5h that are formed at the first end edge portion of the case are inserted into the first cut portion 4c and the second cut portion 4d of the first rail 4a respectively. The case 5 is slid with respect to the guide rail 4 such that the first engagement portion 5g moves to a position away from the first cut portion 4c. In this state, the second component member 3 is attached to the first component member 2. Thus, the stopper 8 can prevent the first engagement portion 5g from returning to the position of the first cut portion 4c. Thus, the first end edge portion of the case 5 can be prevented from falling from the cut portions (4c, 4d) of the guide rail 4 after the second component member 3 is fitted to the first component member 2.

The present disclosure is not limited to the appearance or configuration described in the above-mentioned embodiment, and can be subjected to various alterations, additions, and deletions within such a range as not to change the scope of the present disclosure. For example, the first and second engagement portions 5g and 5h of the case 5 are formed in a projecting shape as shown in FIG. 4 and FIG. 7. The first and second engagement portions 5g and 5h that are in a projecting shape are held through cooperation between the protrusion portion 4n and the first rail 4a. Instead of this, the first engagement portion 5g of the case 5 may be a recess portion. More specifically, it is possible to adopt, for example, a configuration in which the first engagement portion 5g of the case 5 is a recess portion and a projection portion that is fitted in the recess portion is formed on the first rail 4a side.

As shown in FIG. 4, FIG. 6, and FIG. 9, the case 5 is attached to the guide rail 4 by inserting the first engagement portion 5g and the second engagement portion 5h that are formed at the first end edge portion from the cut portions (4c, 4d) of the guide rail 4 respectively. For example, a cut portion may be provided in the second rail 4b in addition to the cut portions (4c, 4d) of the first rail 4a. At this time, the case 5 may be attached to the guide rail 4 through insertion of the first engagement portion 5g and the second engagement portion 5h into the cut portions (4c, 4d) of the first rail respectively, and through insertion of a third engagement portion formed at the second end edge portion on a side opposite to the first end edge portion into the cut portion of the second rail 4b. Furthermore, the cut portions (4c, 4d) of the first rail and the cut portion of the second rail 4b may be different in width from each other.

As shown in FIG. 4, FIG. 8, and FIG. 9, the recess portion 5k of the case 5 is fitted to the second rail 4b that is in a projecting shape. Instead of this, the second rail 4b may be formed in the shape of, for example, a mountain or a trapezoid, and the case 5 may be attached using the corresponding recess portion 5k of the case 5 in a shape corresponding thereto.

As shown in FIG. 4 and FIG. 7, the case 5 has the first engagement portion 5g and the second engagement portion 5h at the head portions of the vertical wall portions 5a and 5b respectively, and has the lower rail projection portion 5i, the bottom surface projection portions 5j, and the elastic strip 5d on the bottom surface thereof. Instead of this, for example, the first rail 4a may be provided on the upper surface 4r of the base portion 4q, the second rail 4b may be provided on the visor upper edge, and the case 5 may be used upside down. At this time, the distal end surface 5v of the first engagement portion 5g and a distal end surface 5w of the second engagement portion 5h may be formed in parallel with the upper surface 4r.

For example, both cores of the first component member 2 and the second component member 3 may be formed of hard resin, and the second component member 3 may be formed of foamed resin. As shown in FIG. 10, the first component member 2 and the second component member 3 are separate from each other. Instead of this, for example, the first component member 2 and the second component member 3 may be integrally formed by being coupled to each other via a hinge formed of resin. In this case, the guide rail 4 may be provided on one of the first component member 2 side and the second component member 3 side.

As shown in FIG. 10, the stopper 8 is provided on the second component member 3. Instead of this, for example, the stopper 8 may be provided separately. The stopper 8 may be formed, for example, in accordance with the shape and size of the stopper accommodation region 4e, instead of being formed in the shape of a quadrangular prism.

As shown in FIG. 3, FIG. 4, and FIG. 11, by forming the opening portion 4l that is smaller in diameter than the distal end portion 7e of the lateral support shaft 7b in the innermost wall portion 4k, instead of the stopper 8, the distal end portion 7e of the lateral support shaft 7b may be stopped by the opening portion 4l without being inserted into the opening portion 4l, and thus the opening portion 4l may function as the stopper 8.

DESCRIPTION OF REFERENCE SYMBOLS

1 VEHICLE SUN VISOR
1a VISOR BODY
2 FIRST COMPONENT MEMBER
3 SECOND COMPONENT MEMBER
4 GUIDE RAIL
4a FIRST RAIL (GUIDE RAIL BODY)
4b SECOND RAIL (GUIDE RAIL BODY)
4c INNERMOST-SIDE CUT PORTION (FIRST CUT PORTION)
4d INLET-SIDE CUT PORTION (SECOND CUT PORTION)
5 CASE
5a, 5b VERTICAL WALL PORTIONS
5g FIRST ENGAGEMENT PORTION (FIRST END EDGE PORTION)
5h SECOND ENGAGEMENT PORTION (FIRST END EDGE PORTION)
5i, 5j, 5k SECOND END EDGE PORTIONS
6 CLIP
7 SUPPORT SHAFT
8 STOPPER

What is claimed is:

1. A vehicle sun visor comprising:
a visor body that includes a first component member and a second component member that are stacked in a thickness direction;
a support shaft that is inserted into the visor body to support the visor body such that the visor body is turnable between a service position and a storage position;
a case that supports the support shaft such that the support shaft is turnable in the visor body, the case being slidably fitted to the visor body;
a clip that is provided in the case and that urges the visor body toward the storage position by urging the support shaft; and
a guide rail that is formed integrally with the first component member to prevent the case from falling in the thickness direction with respect to the first component member and to support the case such that the case is slidable with respect to the first component member,
wherein the guide rail includes a first rail and a second rail, the first rail and the second rail both including protruding portions that protrude toward each other along an up-down direction of the vehicle sun visor with the case in between,
the protruding portions of the first rail and the second rail cooperate to prevent the case from falling off in a thickness direction with respect to the first component member, the case includes an engagement portion protrusion that is sandwiched by a first portion of the first component member and the protruding portion of the first rail, in the thickness direction, the case also includes a lower rail projection portion that is sandwiched by a second portion of the first component member and the protruding portion of the second rail, in the thickness direction, and the engagement portion protrusion and the lower rail projection portion are disposed on opposite sides of the case in the up-down direction.

2. The vehicle sun visor according to claim 1, wherein:
the first rail supports a first end edge portion of the case such that the first end edge portion is slidable, and the second rail supports a second end edge portion of the case that is located opposite to the first end edge portion such that the second end edge portion is slidable; and
the first rail and the second rail are formed integrally with the first component member.

3. The vehicle sun visor according to claim 1, wherein:
the case has a first end edge portion that engages with the guide rail; and
the guide rail has
a guide rail body that is able to be engaged with the first end edge portion such that the first end edge portion is slidable and is unable to fall in the thickness direction of the visor body, the guide rail body being long in a sliding direction, and
at least one cut portion into which the first end edge portion is insertable in the thickness direction of the first component member.

4. The vehicle sun visor according to claim 3, wherein the second component member has a stopper that protrudes from the second component member toward an end portion of the guide rail on the first component member and keeps the first end edge portion from disengaging from the at least one cut portion of the guide rail in a state in which the second component member is attached to the first component member.

5. The vehicle sun visor according to claim 3, wherein:
the first end edge portion has a first engagement portion and a second engagement portion on a straight line parallel to the sliding direction of the case;
the first engagement portion is formed at or in vicinity of a first end portion of the case in the sliding direction and has a first width in the sliding direction, and the second engagement portion is formed at or in vicinity of a second end portion on an opposite end side with respect to the first end portion and has a second width in the sliding direction narrower than the first width; and
the at least one cut portion of the guide rail includes
a first cut portion which has a width in the sliding direction wider than the first width, and into which the first engagement portion is insertable in the thickness direction, and
a second cut portion which has a width in the sliding direction narrower than the first width and wider than the second width, and into which the second engagement portion is insertable in the thickness direction.

6. The vehicle sun visor according to claim 1, wherein the clip is arranged so as to contact the support shaft.

7. A vehicle sun visor comprising:
a visor body that includes a first component member and a second component member that are stacked in a thickness direction;
a support shaft that is inserted into the visor body to support the visor body such that the visor body is turnable between a service position and a storage position;
a case that supports the support shaft such that the support shaft is turnable in the visor body, the case being slidably fitted to the visor body;
a clip that is provided in the case and that urges the visor body toward the storage position by urging the support shaft; and
a guide rail that is formed integrally with the first component member to prevent the case from falling in the thickness direction with respect to the first component member and to support the case such that the case is slidable with respect to the first component member,
wherein the case has a first end edge portion that engages with the guide rail, and
the guide rail has
a guide rail body that is able to be engaged with the first end edge portion such that the first end edge portion is slidable and is unable to fall in the thickness direction of the visor body, the guide rail body being long in a sliding direction, and at least one cut portion into which the first end edge portion is insertable in the thickness direction of the first component member.

8. The vehicle sun visor according to claim 7, wherein the second component member has a stopper that protrudes from the second component member toward an end portion of the guide rail on the first component member and keeps the first end edge portion from disengaging from the at least one cut portion of the guide rail in a state in which the second component member is attached to the first component member.

9. The vehicle sun visor according to claim 7, wherein:
the first end edge portion has a first engagement portion and a second engagement portion on a straight line parallel to the sliding direction of the case;
the first engagement portion is formed at or in vicinity of a first end portion of the case in the sliding direction and has a first width in the sliding direction, and the second engagement portion is formed at or in vicinity of a second end portion on an opposite end side with respect to the first end portion and has a second width in the sliding direction narrower than the first width; and
the at least one cut portion of the guide rail includes
a first cut portion which has a width in the sliding direction wider than the first width, and into which the first engagement portion is insertable in the thickness direction, and
a second cut portion which has a width in the sliding direction narrower than the first width and wider than the second width, and into which the second engagement portion is insertable in the thickness direction.

10. The vehicle sun visor according to claim 7, wherein the clip is arranged so as to contact the support shaft.

* * * * *